United States Patent
Paterour et al.

(10) Patent No.: US 12,418,786 B2
(45) Date of Patent: Sep. 16, 2025

(54) METHOD FOR INITIATING MCDATA COMMUNICATION WITHIN A REGROUP OF COMMUNICATION GROUPS IN A 3GPP MCS NETWORK

(71) Applicant: AIRBUS DS SLC, Elancourt (FR)

(72) Inventors: Olivier Paterour, Elancourt (FR); François Piroard, Elancourt (FR)

(73) Assignee: AIRBUS DS SLC, Elancourt (FR)

( * ) Notice: Subject to any disclaimer, the term of this patent is extended or adjusted under 35 U.S.C. 154(b) by 322 days.

(21) Appl. No.: 18/182,820

(22) Filed: Mar. 13, 2023

(65) Prior Publication Data

US 2023/0292102 A1    Sep. 14, 2023

(30) Foreign Application Priority Data

Mar. 14, 2022 (FR) ...................................... 2202210

(51) Int. Cl.
*H04W 8/18* (2009.01)
*H04W 80/10* (2009.01)

(52) U.S. Cl.
CPC ............ *H04W 8/186* (2013.01); *H04W 80/10* (2013.01)

(58) Field of Classification Search
CPC ....... H04W 8/186; H04W 80/10; H04W 4/08; H04L 65/1016; H04L 65/1046; H04L 65/1073; H04L 65/1104; H04L 65/1069
See application file for complete search history.

(56) References Cited

U.S. PATENT DOCUMENTS

| | | | |
|---|---|---|---|
| 11,363,074 B2* | 6/2022 | Shah | H04L 65/1086 |
| 12,101,364 B2* | 9/2024 | Sangameshwara | H04N 21/4788 |
| 2017/0070868 A1 | 3/2017 | Allen et al. | |
| 2017/0134444 A1* | 5/2017 | Buckley | H04L 9/3271 |
| 2019/0109909 A1* | 4/2019 | Sangameshwara | H04L 65/1104 |
| 2019/0273773 A1* | 9/2019 | Pattan | H04L 67/06 |
| 2020/0120454 A1* | 4/2020 | Gundur | H04L 65/1016 |
| 2023/0309190 A1* | 9/2023 | Kapale | H04W 4/10 |
| 2023/0422000 A1* | 12/2023 | Paterour | H04L 41/5051 |

FOREIGN PATENT DOCUMENTS

WO    WO 2022/013190 A1    1/2022

OTHER PUBLICATIONS

Solé DV, Augé AC. A distributed man-machine dispatching architecture for emergency operations based on 3GPP mission critical services. IEEE access. Dec. 18, 2017;6:11614-23. (Year: 2017).*
Search Report as issued in French Patent Application No. FR2202210, dated Oct. 11, 2022.

(Continued)

*Primary Examiner* — Fayyaz Alam
(74) *Attorney, Agent, or Firm* — Pillsbury Winthrop Shaw Pittman LLP (57) ABSTRACT

A method for initiating an MCData communication within a regroup of communication groups, the method being implemented by a network according to the 3GPP MCS standard, wherein an MCData communication may include short data messages or file distribution. In addition, some information is added in the different transmissions to allow additional verifications by the different entities.

10 Claims, 6 Drawing Sheets

(56) References Cited

OTHER PUBLICATIONS

"LTE; Mission Critical (MC) services over LTE; Part 1: Common test environment (3GPP TS 36.579-1 version 15.3.1 Release 15)", ETSI Technical Specification, European Telecommunications Standards Institute (ETSI), vol. 3GPP RAN, No. VI5.3.I, Oct. 2021 (Oct. 21, 2021), pp. 1-549, XP014417409, Retrieved from the Internet: URL:http://www.etsi.org/deliver/etsi_ts/136500_136599/13657901/15.03.01_60/ts_1365790lv150301p.pdf.

* cited by examiner

METHOD FOR INITIATING MCDATA COMMUNICATION WITHIN A REGROUP OF COMMUNICATION GROUPS IN A 3GPP MCS NETWORK

CROSS-REFERENCE TO RELATED APPLICATIONS

This application claims priority to French Patent Application No. 2202210, filed Mar. 14, 2022, the entire content of which is incorporated herein by reference in its entirety.

TECHNICAL FIELD OF THE INVENTION

The technical field of the invention is that of telecommunications.

The present invention relates to a method for initiating MCData communication within a regroup of communication groups in a 3GPP MCS network.

TECHNOLOGICAL BACKGROUND OF THE INVENTION

The PMR (Professional Mobile Radio) radiocommunication standards TETRAPOL®, TETRA® or P25® allow the implementation of secure professional networks. These narrowband networks are national or local area networks: they are implemented for example within an organisation such as a company, within a country for example for the communications of firemen, police forces, the military etc.

These networks are evolving to support broadband exchanges. The 3GPP standard governing mobile networks of the "GSM" (Global System for Mobile Communications) type, and more particularly in deployments resorting to critical communications services defined by the 3GPP, called "MCS" (Mission Critical Services), allows for these secure broadband exchanges.

Figure 1:
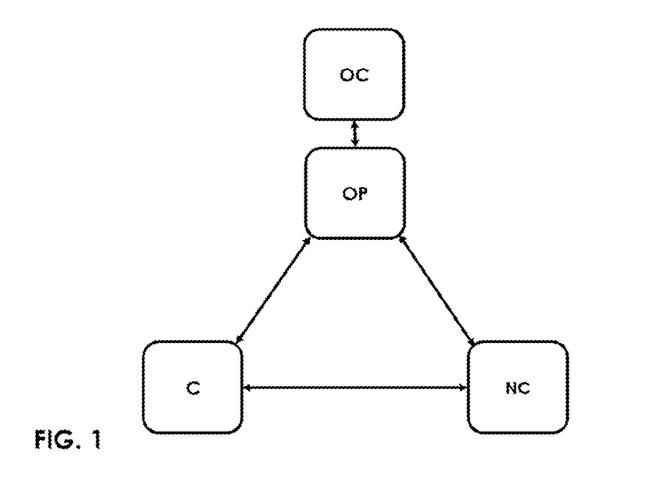
FIG. 1 shows a schematic representation of a network according to the 3GPP MCS standard.

Such a network is, for example, represented in FIG. 1. It comprises a so-called Originating Client (OC) in the 3GPP MCS connected to a so-called Originating Participating (OP) Server in the 3GPP MCS. The OP participating server can communicate with other servers in the network. In FIG. 1, the OP participating server can communicate with a so-called C Controlling Server and a so-called NC Non-Controlling Server in 3GPP MCS. The OP participating, C controlling and NC non-controlling servers are of the "MCX servers" type as defined in 3GPP MCS.

The NC non-controlling server and the C Controlling server may also communicate with each other. The OP participating server is a server that is in charge of managing the OC originating client. The C Controlling server is in charge of managing a communication group within which the OC originating client wishes to communicate. The NC Non-Controlling server can be seen as a sub-server of the communications group within which the OC originating client wishes to communicate and is in charge of managing one of the "constituent" groups of a regroup of communications groups.

By "communication network according to the 3GPP MCS standard", it is meant a communication network that is compatible with the 3GPP MCS standard, and more particularly with the current version of 3GPP, which is version 17, with previous versions from version 13 onwards, and with subsequent versions incorporating all the characteristics of the invention.

In the 3GPP MCS standard, the following communication services are defined:

MCPTT (Mission Critical Push To Talk), which allows for voice communications,
MCVideo, which allows for video communications,
MCData, which comprises three sub-services:
SDS (Short Data Service) and
FD (File Distribution),
IPCon (IP Connectivity).

Hereafter, "MCData communication" will be understood as any short data and/or file transmission governed by the MCData service, as opposed to voice MCPTT or video MCVideo transmissions. These MCData communications are made, in the case of transmission on the signalling plane, by SIP MESSAGE requests, or established, in the case of transmission within a session established on the user plane, by SIP INVITE requests. SIP is a Session Initiation Protocol. The SIP INVITE message, defined in RFC 3261, is an invite message to another client to participate in a session. These communications can also be of the "IPCon" type.

In the 3GPP MCS standard and in the state of the art, there is currently no procedure when the OC originating client wishes to initiate an MCData communication, that is sending a short data and/or file, in a global group GA regrouping a communication group G1 to which the OC client belongs and a communication group G2 to which the OC client does not necessarily belong. This procedure does not exist either for a single MCData system or for interconnected MCData systems.

Such a procedure exists for MCVideo and MCPTT communications, but is not defined for MCData communications.

There is therefore a need to be able to initiate an MCData communication in a group regrouping a communication group to which the client belongs and a communication group to which the OC client does not necessarily belong.

SUMMARY OF THE INVENTION

The invention provides a solution to the problems previously discussed by allowing an entity to initiate an MCData communication within a regroup of communication groups.

One aspect of the invention relates to a method for initiating, by a first client entity, a short data or file distribution MCData communication within a global communication group regrouping at least one first communication group and at least one second communication group, at least one second client entity being affiliated with the second communication group, the method being implemented in a communication network according to the 3GPP MCS (3rd Generation Partnership Program Mission-Critical System) standard, the network comprising at least:

the first client entity affiliated with the first communication group,
an originating participating server managing the first client entity within the first communication group,
a controlling server being in charge of managing the global communication group,
at least one first non-controlling server of the global communication group being in charge of managing the first communication group,
at least one second non-controlling server of the global communication group being in charge of managing the second communication group, the method comprising the steps of:
transmitting, from the first client entity to the participating server, a first request according to the Session initiation protocol SIP, the first request comprising:

at least one header field comprising constituent group information, the constituent group information identifying the first communication group, and at least one header field comprising called group information, the called group information identifying the global communication group, transmitting, by the participating server to the first controlling server, a second request comprising the same header fields as the first request and further comprising at least one header field comprising the originating user information, the originating user information comprising an identifier of the first client entity, identifying, by the controlling server, the communication groups constituting the global communication group from the called group information, Inviting, by the controlling server of the global communication group, each client entity of each group constituting the global communication group to participate in the communication.

By virtue of the invention, a method for initiating MCData communication within a regroup of communication groups is provided, which method is in accordance with the principles of division of functions between the roles of Participating, Non-Controlling and Controlling servers used elsewhere in the 3GPP MCX specifications, especially in the MCPTT TS 24.379 technical specification.

The first embodiment of the invention allows requests transmitted by any user being a member of one of the constituent groups (not necessarily affiliated) of the global group of regroup to be authorised and the request to be distributed to all members of the constituent groups (not necessarily affiliated) of the global group of regroup.

The second embodiment of the invention provides the additional possibility of allowing only MCData communication initiation requests transmitted by a user affiliated with one of the constituent groups of the regroup of groups. The method according to the invention also provides the ability to distribute the request only to users affiliated with one of the constituent of the regroup of groups, by virtue of verification at the NC non-controlling server.

In addition to the characteristics just discussed in the preceding paragraph, the communication initiation method according to one aspect of the invention may have one or several complementary characteristics among the following, considered individually or according to any technically possible combinations:

inviting by the controlling server of the global communication group of each client entity of each group constituting the global communication group to participate in the communication comprises sending a request according to the "SIP" session initiation protocol to each identified non-controlling server of each identified communication group constituting the global communication group, the request comprising:

at least one header field comprising originating user information, the originating user information comprising an identifier of the first client entity, at least one header field comprising the constituent group information, at least one header field comprising the called group information.

The method further comprises a step of transmitting, by each participating server of each identified communication group constituting the global communication group, a request to each client entity affiliated with the communication group of which it is in charge, the request comprising:

at least one header field comprising destination client entity information, the client entity information comprising the identifier of the destination client entity affiliated with the communication group the non-controlling server is in charge of, at least one header field comprising the originating user information, at least one header field comprising the constituent group information, at least one header field comprising the called group information.

the second request is sent by the participating server to the first non-controlling server, the method further comprising the steps of:

Verifying, by the first non-controlling server, that the first client entity is authorised to initiate MCData communication within the global communication group from the originating user information, If the first client entity is authorised to initiate the MCData communication, transmitting, by the first non-controlling server to the controlling server, a third request identical to the second request.

the verification step is further based on the constituent group information and the called group information.

the step of verifying by the non-controlling server further comprises at least verifying that the first client entity is affiliated with the first communication group from the constituent group information and the originating user information.

the step of verifying by the non-controlling server further comprises at least verifying that the first communication group is included in the global communication group from the constituent group information and the called group information.

Each request according to the "SIP" session initiation protocol is a "SIP MESSAGE" or a "SIP INVITE".

Another aspect of the invention relates to a communication network according to the 3GPP MCS (3rd Generation Partnership Program Mission-Critical System) standard, the network comprising a global communication group formed by at least one first communication group and at least one second communication group, and:

a first client entity affiliated with the first communication group, an originating participating server managing the first client entity within the first communication group, a controlling server in charge of managing the global communication group, at least one first non-controlling server of the global communication group included in the network being in charge of managing the first communication group, at least one second non-controlling server of the global communication group included in the network being in charge of managing the second communication group, the communication network being configured to implement the communication initiation method according to any of the preceding claims.

A further aspect of the invention relates to a computer program product comprising instructions that cause the network according to the invention to perform the steps of the method according to the invention.

Yet another aspect of the invention relates to a computer-readable medium on which the computer program product according to the invention is recorded.

The invention and its different applications will be better understood upon reading the following description and upon examining the accompanying figures.

BRIEF DESCRIPTION OF THE FIGURES

The figures are set forth by way of indicating and in no way limiting purposes of the invention.

DETAILED DESCRIPTION

Figure 2:
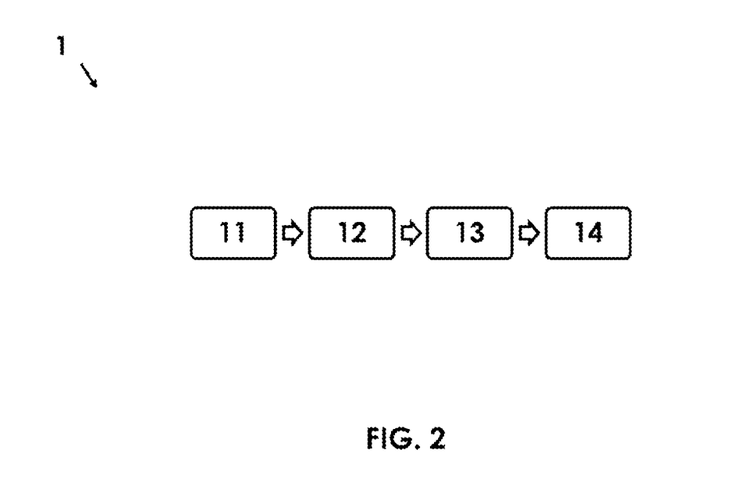
FIG. 2 shows a schematic representation of a method for initiating MCData communication within a regroup of communication groups according to the invention.

Unless otherwise specified, a same element appearing in different figures has a single reference FIG. 2 shows a schematic representation of a method 1 according to a first embodiment of the invention. The method 1 according to a first embodiment of the invention is implemented by the network represented in FIG. 3.

The method 1 is a method for initiating communication within a regroup of communication groups.

Figure 3:
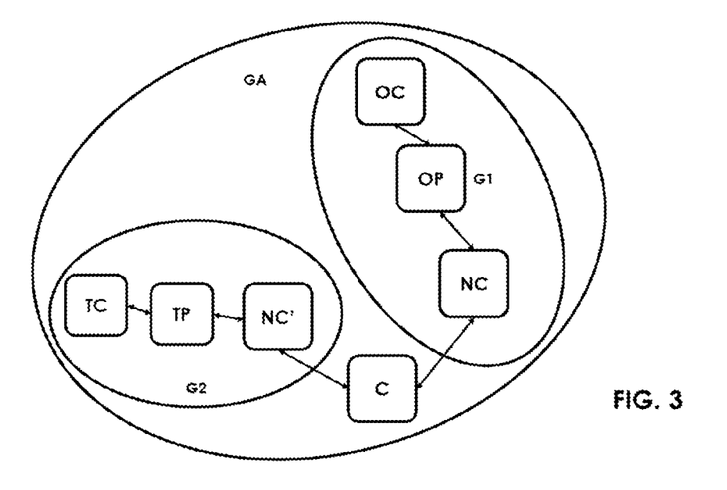
FIG. 3 shows a schematic representation of a 3GPP MCS network according to the invention.

The network represented in FIG. 3 configured to implement the method according to the invention is a network according to the 3GPP MCS standard, that is it is implemented following specifications defined by the 3GPP MCS standard.

The network of FIG. 3 comprises a global communication group GA regrouping two communication groups G1 and G2. An OC client entity is affiliated with the communication group G1. An OP participating server manages the OC client entity within the communication group G1 and an NC non-controlling server of the global communication group is in charge of managing the communication group G1. A second NC' non-controlling server is in charge of managing the second communication group G2. A C controlling server is in charge of managing the global communication group GA. The invention also covers alternatives in which the C controlling server of the global communication group GA is in charge of managing the communication group G1 or managing the communication group G2. The second NC' non-controlling server is connected to the C controlling server. A TP terminal participating server is connected to the second NC' non-controlling server and to a second TC terminal client entity, the TP terminal participating server being in charge of managing the second TC terminal client entity, the second TC terminal client entity being affiliated with the communication group G2

A client entity is a device, preferably a user equipment (UE) comprising at least one memory and at least one processor, the memory comprising instructions which, when executed by the processor, cause the user equipment to implement the actions assigned to it in the following description. Preferably, the client entities comprise a display device, in order to display the MCData content exchanged, for example text, a photo, or any other file. Similarly, the various servers, including controller, non-controller and participating servers, are devices comprising at least one memory and at least one processor, the memory comprising instructions which, when executed by the processor, cause the server to implement the actions assigned to it in the following description. The servers and client entities are connected together through a network such as that represented in FIG. 3, the network implementing wired, wireless communications, or any combination thereof.

Figure 4:
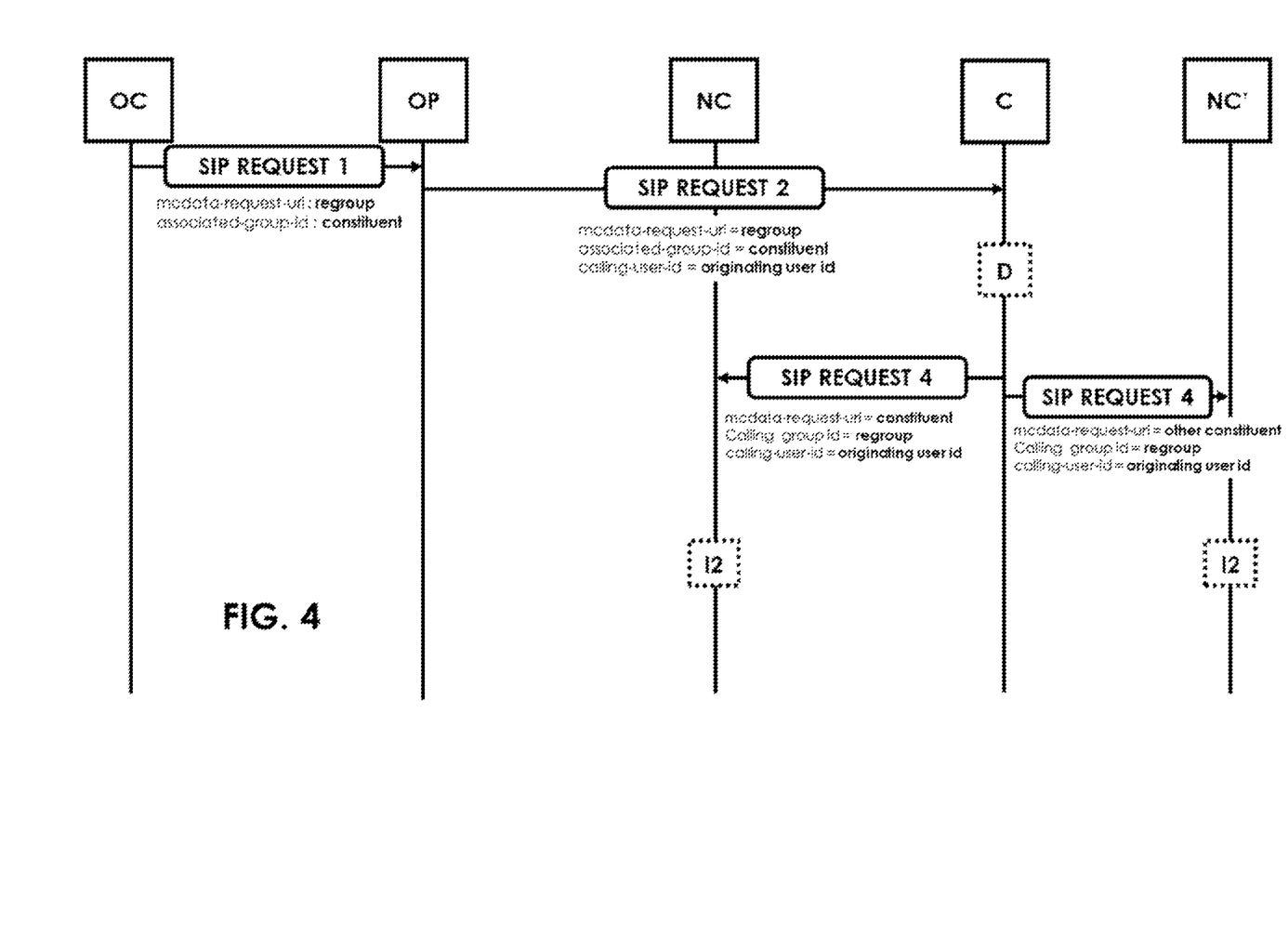
FIG. 4 shows a schematic representation of an MCData communication initiation method according to a first embodiment of the invention.

The method 1 according to a first embodiment of the invention represented in FIGS. 2 and 4 allows the OC originating client entity to initiate an MCData communication within the global communication group GA, that is a communication with at least one other client entity of the global communication group GA, for example with the second C' client entity being a member of one of the constituent groups regrouped in the global group GA. This MCData communication may be a Short Data Service (SDS), File Distribution (FD), or IPCon connectivity type communication. The 3GPP MCData SDS (Short Data Service) standard includes two services:

- the messaging service, for example including text data exchanges and
- The "status" service, which includes "status" exchanges between MCData clients. By status, it is meant short codes. For example, a value of 1 may indicate an "on-site departure" of the client entity, a value of 2 may indicate an "on-site arrival" of the client entity, etc. Some sectors use these codes to exchange and provide operational situation information, in addition to voice conversation exchanges.

The method 1 according to a first embodiment of the invention both applies to communication groups resulting from regroup of communication groups, or to temporary communication groups.

As shown in FIGS. 2 and 4, the first OC client entity transmits, in a step 11, a "SIP REQUEST 1" message to the OP participating server of its communication group G1. SIP is a Session Initiation Protocol. The SIP REQUEST is either a SIP INVITE, defined by RFC 3261, a message inviting another client to participate in a session, or a SIP MESSAGE, defined by RFC 3428, which allows the exchange of "instant" messages. According to the invention, this message comprises a <mcdata-request-uri> header field comprising called group information, indicating to the destination server, that is the OP participating server, the global group of regroup within which the OC client entity wishes to initiate an MCData communication, that is the global group GA in this example.

The SIP REQUEST 1 also includes a <associated-group-id> header field comprising constituent group information, indicating to which communication group included in the global group GA the OC client entity belongs. In the present example, the group G1 of the OC client entity included in the global group GA is so-called "constituent", because it is part of the two groups G1 and G2 "constituting" the global group GA.

The method 1 according to a first embodiment of the invention comprises a second step 12 implemented by the OP participating server. The OP participating server is a server belonging to the same communication group G1 as the OC client entity and managing the OC client entity within this communication group G1. The OP participating server transmits in step 12, to the C controlling server managing the global communication group GA, a SIP REQUEST 2 according to the Session initiation protocol SIP. The OP participating server has the knowledge of the C controlling server through static or dynamic configuration.

The second SIP REQUEST 2 comprises the same header fields as the first SIP REQUEST 1 and further comprises a "calling-user-id" header field comprising information indicating the identifier of the originating user, that is of the OC client entity.

In this first embodiment, the transmission is direct from the OP participating server to the C controlling server.

The method 1 according to a first embodiment of the invention then comprises a step 13 of identifying, by the C controlling server, the communication groups G1 and G2 constituting the global communication group GA from the called group information received in the SIP REQUEST 2. This step is represented in FIG. 4 by the square "D".

In a step 14 of the method 1 according to a first embodiment of the invention, the C controlling server of the global communication group GA invites each client entity of each group constituting the global communication group to participate in the communication.

This invite takes the form of a SIP REQUEST 4 in FIG. 4, the request being transmitted, by the control server C, to all the NC and NC' non-controlling servers managing communication groups G1 and G2 constituting the global communication group GA. This SIP REQUEST 4 includes the "calling-user-id" header field including information indicating the identifier of the originating user, that is the OC client entity, the <mcdata-request-uri> header field including called group information, indicating to the destination server, that is to each NC non-controlling server, indicating to which communication group included in the global group GA the request destination NC non-controlling server belongs, and the <associated-group-id> header field comprising a belonging group information, the belonging group being the group to which the C controlling server belongs.

Figure 5:
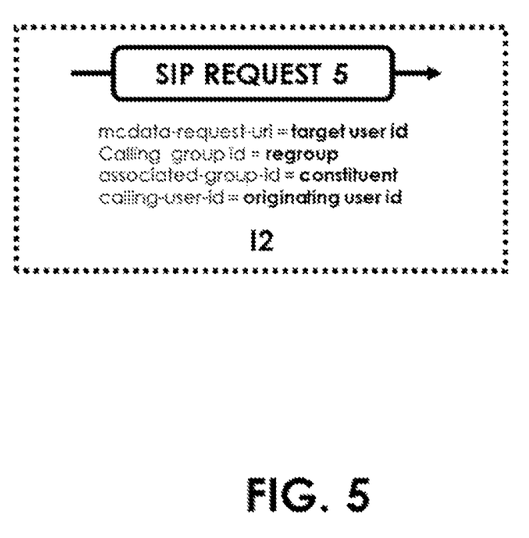
FIG. 5 shows a schematic representation of a step of the method according to the invention.

This invite also includes sending a SIP REQUEST 5 represented in FIG. 5, by each NC and NC' non-controlling server to each OP and TP participating server, so that each OP and TP participating server can indicate to the client entities it manages to participate in the MCData communication, that is to receive a short data message or a file, sent by the first OC client entity. This fifth SIP REQUEST 5 comprises:
- a <calling group id> header field comprising a calling group information, the calling group information indicating the global communication group GA,
- a <mcdata-request-uri> header field comprising a destination client entity information, the destination client entity information indicating the client entity that is the destination of the SIP REQUEST 5 and called to participate in the MCData communication,
- a <associated-group-id> header field comprising belonging group information, the belonging group being the group to which the NC or NC' non-controlling server sending this SIP REQUEST 5 belongs,
- a <calling-user-id> header field comprising calling client entity information, that is the identity of the client entity initiating the MCData communication.

This first embodiment can be implemented when the group is set up for lossless communication as defined in the 3GPP MCS TS 23.282 technical specification, where data should be distributed to all members of a group even if they are not affiliated and even in case of absence, using if necessary storage in message stores of these users.

In a second embodiment, an additional verification is performed, also resulting in a modification of step 12 of the method according to the invention. The method according to a second embodiment, represented in FIGS. 6 and 7, will now be described.

Figure 6:
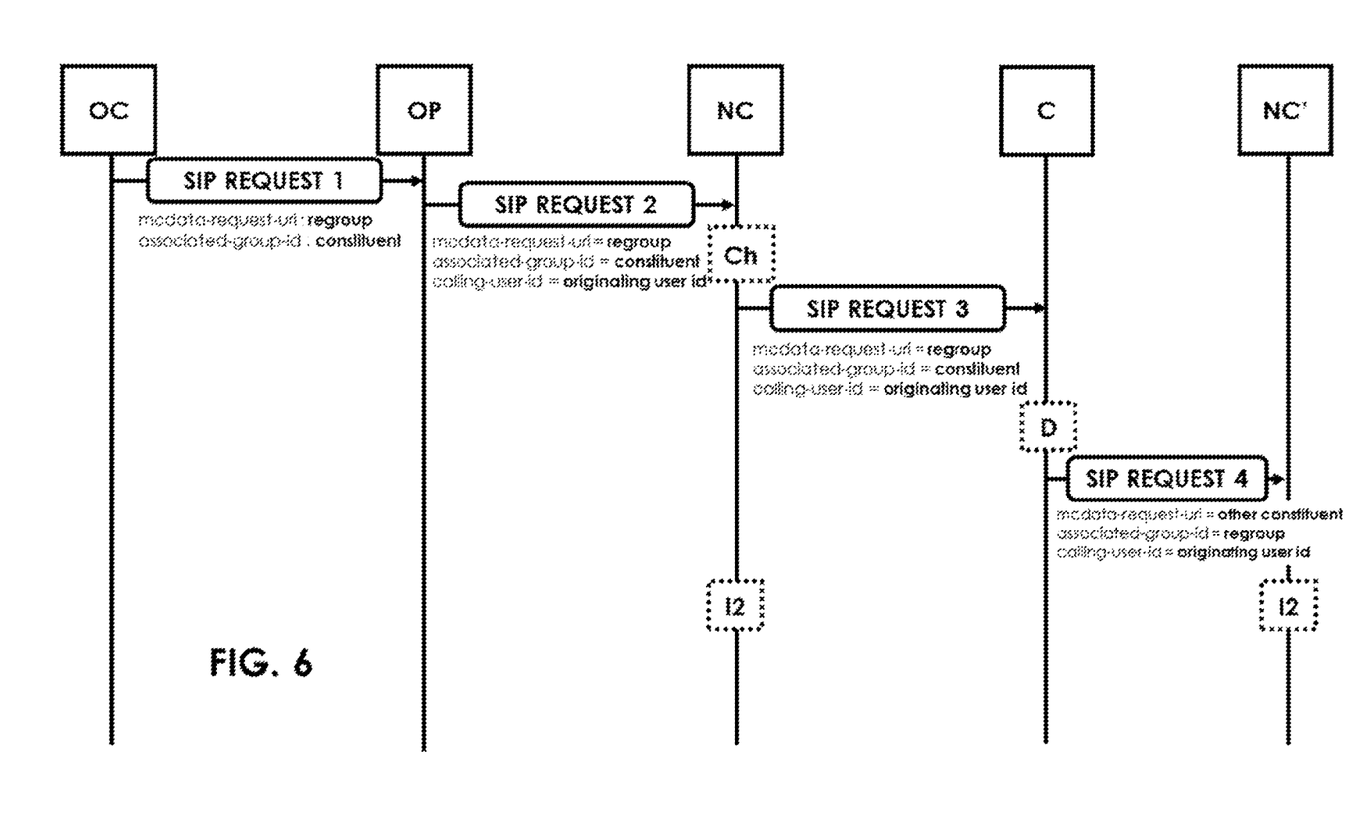
FIG. 6 shows a schematic representation of an MCData communication initiation method according to a second embodiment of the invention.

As shown in FIG. 6, the first OC client entity transmits, in a step 11, a "SIP REQUEST 1" to the OP participating server of its communication group G1. According to the invention, this request includes a <mcdata-request-uri> header field comprising called group information, indicating to the destination server, that is the OP participating server, the global group of regroup within which the OC client entity wishes to initiate an MCData communication, that is the global group GA in this example.

The SIP REQUEST 1 request also includes a <associated-group-id> header field comprising constituent group information, indicating to which communication group included in the global group GA the OC client entity belongs. In the present example, the group G1 of the OC client entity included in the global group GA is so-called "constituent", because it is part of the two groups G1 and G2 "constituting" the global group GA.

The method according to a second embodiment of the invention comprises a second step 12 implemented by the OP participating server. The OP participating server is a server belonging to the same communication group G1 as the OC client entity and managing the OC client entity within this communication group G1. This step 12 comprises three sub-steps, that is a transmission is first performed to the first NC non-controlling server, which will then verify that the client entity is authorised to perform the MCData communication within the global group, and which will transmit the request to the C controlling server.

Figure 7:
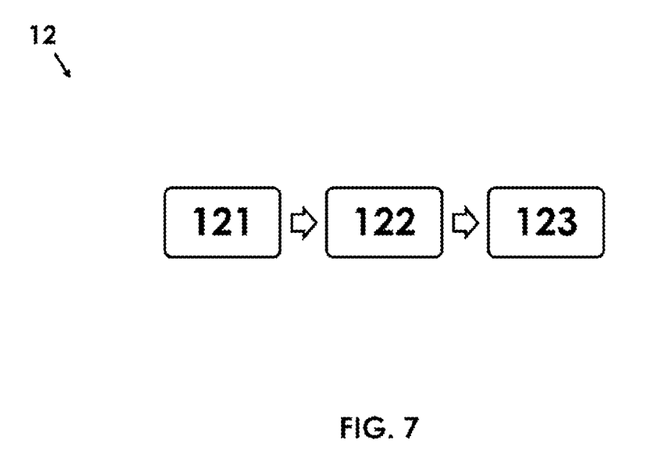
FIG. 7 shows a schematic representation of a further step of the method according to the invention.

The step 12 represented in FIG. 7 comprises a first sub-step 121 of transmitting the second SIP REQUEST 2 from the OP participating server to the first non-controlling server NC, as represented in FIG. 6.

In a sub-step 122, the first NC non-controlling server of the global communication group GA, in charge of managing the first communication group G1, performs a verification that the first OC client entity is authorised to initiate the "MCData" communication within the global communication group GA from the originating user information included in the second REQUEST 2. This is represented in FIG. 6 by the box "Ch". This verification may for example include verifying that the user is a member of the communication group G1. This verification step may further comprise, in a complementary embodiment, verifying that the first OC client entity is affiliated with the first communication group G1 from the constituent group information and the originating user information. In another complementary alternative, this verification step comprises verifying that the first communication group G1 is included in the global communication group GA from the constituent group information and the called group information.

If the first OC client entity is authorised to initiate the "MCData" communication, step 12 comprises a substep 123 of transmitting, by the first NC non-controlling server to the C controlling server of the global communication group GA, a third SIP REQUEST 3, identical to the second request.

The method according to the second embodiment of the invention then comprises a step 13 of identifying, by the C controlling server, the communication groups G1 and G2 constituting the global communication group GA from the called group information received in the SIP REQUEST 2. This step is represented in FIG. 6 by the square "D".

In a step 14 of the method according to the second embodiment of the invention, the C controlling server of the global communication group GA invites each client entity of each group constituting the global communication group to participate in the communication.

This invite takes the form of a SIP REQUEST 4 in FIG. 6, the request being transmitted, by the C controlling server, to all the NC and NC' non-controlling servers managing the communication groups G1 and G2 constituting the global communication group GA. This SIP REQUEST 4 includes the "calling-user-id" header field comprising information indicating the identifier of the originating user, that is of the OC client entity, the <mcdata-request-uri> header field including called group information, indicating to the destination server, that is to each NC non-controlling server, indicating to which communication group included in the global group GA the request destination NC non-controlling server belongs, and the <associated-group-id> header field comprising belonging group information, the belonging group being the group to which the C controlling server belongs.

This invite also includes sending a SIP REQUEST 5 represented in FIG. 5, by each NC and NC' non-controlling server to each OP and TP participating server, so that each OP and TP participating server can indicate to the client entities it manages to participate in the MCData communication, that is to receive a short data message or a file, sent by the first OC client entity. This fifth SIP REQUEST 5 comprises:
  a <calling group id> header field comprising calling group information, the calling group information indicating the global communication group GA,
  a <mcdata-request-uri> header field comprising destination client entity information, the destination client entity information indicating the client entity that is the destination of the SIP REQUEST 5 and called to participate in the MCData communication,
  a <associated-group-id> header field comprising a belonging group information, the belonging group being the group to which the NC or NC' non-controlling server sending this SIP REQUEST 5 belongs,
  a <calling-user-id> header field comprising calling client entity information, that is the identity of the client entity initiating the MCData communication.

This second embodiment can also be implemented when the group is set up for lossless communication as defined in the 3GPP MCS TS 23.282 technical specification, where data should be distributed to all members of a group even if they are not affiliated and even in case of absence, using if necessary storage in message stores of these users.

The method according to the invention makes it possible to initiate an MCData communication within a 3GPP MCS network, which procedure does not exist and is not provided for by the standard. The method 1 according to the invention allows a simple, fast communication initiation, without any unnecessary steps, and for verifying:
  That the client entity is authorised to initiate a communication within the global group of regroup,
  That the constituent groups still belong to the global group of regroup.

The invention claimed is:

1. A method for initiating, by a first client entity, a short data or file distribution MCData communication within a global communication group regrouping at least one first communication group and at least one second communication group, at least one second client entity being affiliated with the second communication group, the method being implemented in a communication network according to the 3GPP MCS (3rd Generation Partnership Program Mission-Critical System) standard, the network comprising:
  the first client entity affiliated with the first communication group,
  an originating participating server managing the first client entity within the first communication group,
  a controlling server being in charge of managing the global communication group,
  at least one first non-controlling server of the global communication group being in charge of managing the first communication group,
  at least one second non-controlling server of the global communication group being in charge of managing the second communication group,
the method comprising:
  transmitting, by the first client entity to the participating server, a first request according to a session initiation protocol (SIP), the first request comprising:
    at least one header field comprising constituent group information, the constituent group information identifying the first communication group, and
    at least one header field comprising called group information, the called group information identifying the global communication group,
  transmitting, by the participating server to the first controlling server, a second request comprising the same header fields as the first request and further comprising at least one header field comprising the originating user information, the originating user information comprising an identifier of the first client entity,
  identifying, by the controlling server, the communication groups constituting the global communication group from the called group information, and
  inviting, by the controlling server of the global communication group, each client entity of each group constituting the global communication group to participate in the communication.

2. The method according to claim 1, wherein inviting, by the controlling server of the global communication group, each client entity of each group constituting the global communication group to participate in the communication comprises sending a request according to the SIP session initiation protocol to each identified non-controlling server of each identified communication group constituting the global communication group, the request comprising:
  at least one header field comprising the originating user information,
  at least one header field comprising the constituent group information,
  at least one header field comprising the called group information.

3. The method according to claim 2, further comprising transmitting, by each participating server of each identified communication group constituting the global communication group, sending a request to each client entity affiliated with the communication group of which it is in charge, the request comprising:
  at least one header field comprising destination client entity information, the client entity information comprising the identifier of the destination client entity affiliated with the communication group the non-controlling server is in charge of,
  at least one header field comprising the originating user information,
  at least one header field comprising the constituent group information,
  at least one header field comprising the called group information.

4. The method according to claim 1, wherein the second request is sent by the participating server to the first non-controlling server, the method further comprising:

verifying, by the first non-controlling server, that the first client entity is authorised to initiate the MCData communication within the global communication group from the originating user information, when the first client entity is authorised to initiate the MCData communication, transmitting, by the first non-controlling server to the controlling server, a third request identical to the second request.

5. The method according to claim 4, wherein the verification is further based on the constituent group information and the called group information.

6. The method according to claim 5, wherein the verifying by the non-controlling server further comprises at least verifying that the first client entity is affiliated with the first communication group from the constituent group information and the originating user information.

7. The method according to claim 4, wherein the verifying by the non-controlling server further comprises at least verifying that the first communication group is included in the global communication group from the constituent group information and the called group information.

8. The method according to claim 1, wherein each request according to the SIP session initiation protocol is a SIP MESSAGE or a SIP INVITE.

9. A communication network according to the 3GPP MCS (3rd Generation Partnership Program Mission-Critical System) standard, the network comprising a global communication group formed by at least one first communication group and at least one second communication group, and:
- a first client entity affiliated with the first communication group,
- an originating participating server managing the first client entity within the first communication group,
- a controlling server in charge of managing the global communication group,
- at least one first non-controlling server of the global communication group included in the network being in charge of managing the first communication group,
- at least one second non-controlling server of the global communication group included in the network being in charge of managing the second communication group,
- the communication network being configured to implement the communication initiation method according to claim 1.

10. A non-transitory computer-readable medium, comprising computer readable instructions for carrying out the method of claim 1.

* * * * *